(12) United States Patent
Chien et al.

(10) Patent No.: US 7,743,871 B2
(45) Date of Patent: Jun. 29, 2010

(54) ANTI-TILT APPARATUS AND FRAME STRUCTURE OF TILTING VEHICLE USING THE SAME

(75) Inventors: Chin-Pin Chien, Taipei County (TW); Yu-Yin Peng, Hsinchu (TW); Jyh-Chun Chang, Taipei County (TW); Tien-Ho Gau, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 337 days.

(21) Appl. No.: 11/979,686

(22) Filed: Nov. 7, 2007

(65) Prior Publication Data

US 2009/0057048 A1   Mar. 5, 2009

(30) Foreign Application Priority Data

Aug. 28, 2007   (TW) ............................... 96131769 A

(51) Int. Cl.
*B60K 28/12* (2006.01)
(52) U.S. Cl. ..................................... 180/282
(58) Field of Classification Search ................ 180/282, 180/908, 76; 280/5.506, 6.15, 6.154, 124.103, 280/755
See application file for complete search history.

(56) References Cited

U.S. PATENT DOCUMENTS 4,013,858 A * 3/1977 Grebner et al. ............ 200/43.04

FOREIGN PATENT DOCUMENTS

EP   1561612 A1   8/2005

\* cited by examiner

*Primary Examiner*—Faye M. Fleming
(74) *Attorney, Agent, or Firm*—Birch, Stewart, Kolach & Birch, LLP

(57) ABSTRACT

An anti-tilt apparatus is provided in the present invention, in which a frame of a vehicle is locked or released for tilt by a locking mechanism controlled according to the vehicle moving status. In addition, the present invention further provides a frame structure of a tilt vehicle wherein the anti-tilt apparatus and an independent suspended wheel set with a tiltable frame are combined together for maintaining certain comfort, good tracking capability and driving safety while the vehicle is moving and swerving. The anti-tilt apparatus of the present invention functions to lock the tiltable frame while the vehicle is operated in low speed or stop and functions to make wheels simultaneously inwardly incline for providing a tilt capability while the vehicle is swerving in high speed so as to increase higher stability and anti-turnover capability of the vehicle.

17 Claims, 10 Drawing Sheets

ANTI-TILT APPARATUS AND FRAME STRUCTURE OF TILTING VEHICLE USING THE SAME

FIELD OF THE INVENTION

The present invention relates to an anti-tilt apparatus, and more particularly, to an anti-tilt apparatus along with a tilting vehicle using the same, capable of maintaining the stability of the vehicle while the vehicle is operating in low speed and enabling the frame of the vehicle to tilt while the vehicle is operating in high speed.

BACKGROUND OF THE INVENTION

Currently, there are already many types of tilting vehicles available, which can be three-wheeled or four-wheeled vehicles, or even vehicles with more than four wheels, and are configured with all kinds of wheel arrangement, such as those with one front wheel and two rear wheels or vice versa, or those with two front and two rear wheels. Such tilting vehicles can be applied in motorcycles, cars, bicycles, or even toy automobiles. As such tilting vehicle has the mobility and maneuverability of motorcycles and the stability of cars, there are more and more tilting vehicles becoming available, especially in urban area since such tilting vehicle can achieve same anti-overturn ability as conventional vehicles with greatly reduced wheelbase, which can be a great advantage while traveling in small alleys commonly seen in urban area.

Generally, tilting vehicles can be categorized into two groups. One group includes those vehicles with automatic tilting ability that is able to calculate the vehicle's dynamic parameters to determine the degree of inclination for such automatic tilting vehicle. Most automobiles with enclosed vehicle hull belong to the aforesaid group of automatic tilting ability. Another group includes those vehicles without automatic tilting ability, by which the inclination is adjusted by the control of a driver driving the vehicle, and is mostly likely to be seen in bicycles and motorcycles. It is noted that the driver driving a vehicles without automatic tilting ability must put his/her leg down for preventing overturn when he/she is cruising in low speed or stopping.

There are already many studies about the tilting vehicles, one of which is an anti-rolling device for vehicles, disclosed in EP1561612A1. The anti-rolling device for vehicles of the type equipped with a front steer system with articulated quadrilateral structure, and the device has at least one stop element, integral with an element of the quadrilateral structure in its rolling movements, at least one locking element, to lock the position of the stop element for preventing the rolling movements of the quadrilateral structure, and a parking group, guided by command means for commanding the opening or closing of the locking element. However, the aforesaid anti-rolling device still can not lock the vehicle automatically and require a driver to evaluate the current driving condition and thus determine whether to lock the vehicle manually.

SUMMARY OF THE INVENTION

The object of the present invention is to provide an anti-tilt apparatus, capable of controlling a locking mechanism to lock or release a vehicle frame for tilting, and thereby, enabling a tilting vehicle using the frame to have its frame locked while cruising in low speed or stop, and to have it frame released for providing the vehicle with enhanced stability and anti-overturn ability while swerving in high speed.

Another object of the invention is to provide a vehicle frame for tilting vehicles integrating an anti-tilt apparatus and a structure for enabling independently suspended wheels to lean with the vehicle frame, capable of enabling the vehicle to maintain a certain comfort, and possess good tracking ability and driving safety, which is featuring in that: the vehicle hull and the wheels is enabled to incline inwardly simultaneously while negotiating a curve or cornering for providing the vehicle a higher static safety factor (SSF) and thus improving the stability and drivability of the vehicle, moreover, the outside wheel is enabled to provide an additional inward force to the vehicle by enabling the outside wheel to incline inwardly more than the inside wheel while negotiating a curve or cornering so as to improving the tracking ability of the wheels and thus enhancing steering safety.

In an exemplary embodiment, the present invention provides an anti-tilt apparatus, comprising: a tiltable frame, arranged on a tilting vehicle; a control device, capable of generating a control signal according to statuses of the tilting vehicle; a driving unit, coupled to the control device for receiving the control signal and thus generating a driving force accordingly; a locking/releasing unit, coupled to the driving unit for receiving the driving force and thus generating a reaction force accordingly; and a curbing unit, disposed at a side of the locking/releasing unit for responding to the reaction force to lock the tiltable frame at a specific position.

In another exemplary embodiment, the present invention provides an anti-tilt apparatus, comprising: a tiltable frame, arranged on a tilting vehicle; a control device, capable of generating a control signal according to statuses of the tilting vehicle; a driving unit, coupled to the control device for receiving the control signal and thus generating a driving force accordingly; a locking/releasing unit, coupled to the driving unit for receiving the driving force and thus generating a reaction force accordingly; and a curbing unit, disposed at a side of the locking/releasing unit for responding to the reaction force to lock the tiltable frame at a specific position; wherein, the tiltable frame includes a linkage mechanism and an independent suspending mechanism; the linkage mechanism is composed of a ground rod, a floating rod, being placed over the ground rod and parallel thereto, two rocking arms, and a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod, in which an ends of the floating rod is pivotally connected to an end of one of the two rocking arm while another end of the floating rod is pivotally connected to an end of another rocking arm, and an ends of the ground rod is pivotally connected to an end of one of the two rocking arms opposite to that connected to the floating rod while another end of the ground rod is pivotally connected to an end of another rocking arm opposite to that connected to the floating rod; and the independent suspending mechanism is comprised of: a hub, pivotally connected to the rocking arms by at least a pair of suspending rods; and a shock absorber, configured for enabling the top of the shock absorber to pivotally connect to the top of the corresponding rocking arm while enabling the bottom of the shock absorber to pivotally connect to the bottom of the hub.

In another exemplary embodiment, the present invention provides an anti-tilt apparatus, comprising: a tiltable frame, arranged on a tilting vehicle; a locking/releasing unit, for receiving a driving force and thus generating a reaction force accordingly; and a curbing unit, disposed at a side of the locking/releasing unit for responding to the reaction force to lock the tiltable frame at a specific position; wherein, the tiltable frame includes a linkage mechanism and an independent suspending mechanism; the linkage mechanism is composed of a ground rod, a floating rod, being placed over the ground rod and parallel thereto, two rocking arms, and a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod, in which an ends of the floating rod is pivotally connected to an end of one of the two rocking arm while another end of the floating rod is pivotally connected to an end of another rocking arm, and an ends of the ground rod is pivotally connected to an end of one of the two rocking arms opposite to that connected to the floating rod while another end of the ground rod is pivotally connected to an end of another rocking arm opposite to that connected to the floating rod; and the independent suspending mechanism is comprised of: a hub, pivotally connected to the rocking arms by at least a pair of suspending rods; and a shock absorber, configured for enabling the top of the shock absorber to pivotally connect to the top of the corresponding rocking arm while enabling the bottom of the shock absorber to pivotally connect to the bottom of the hub.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
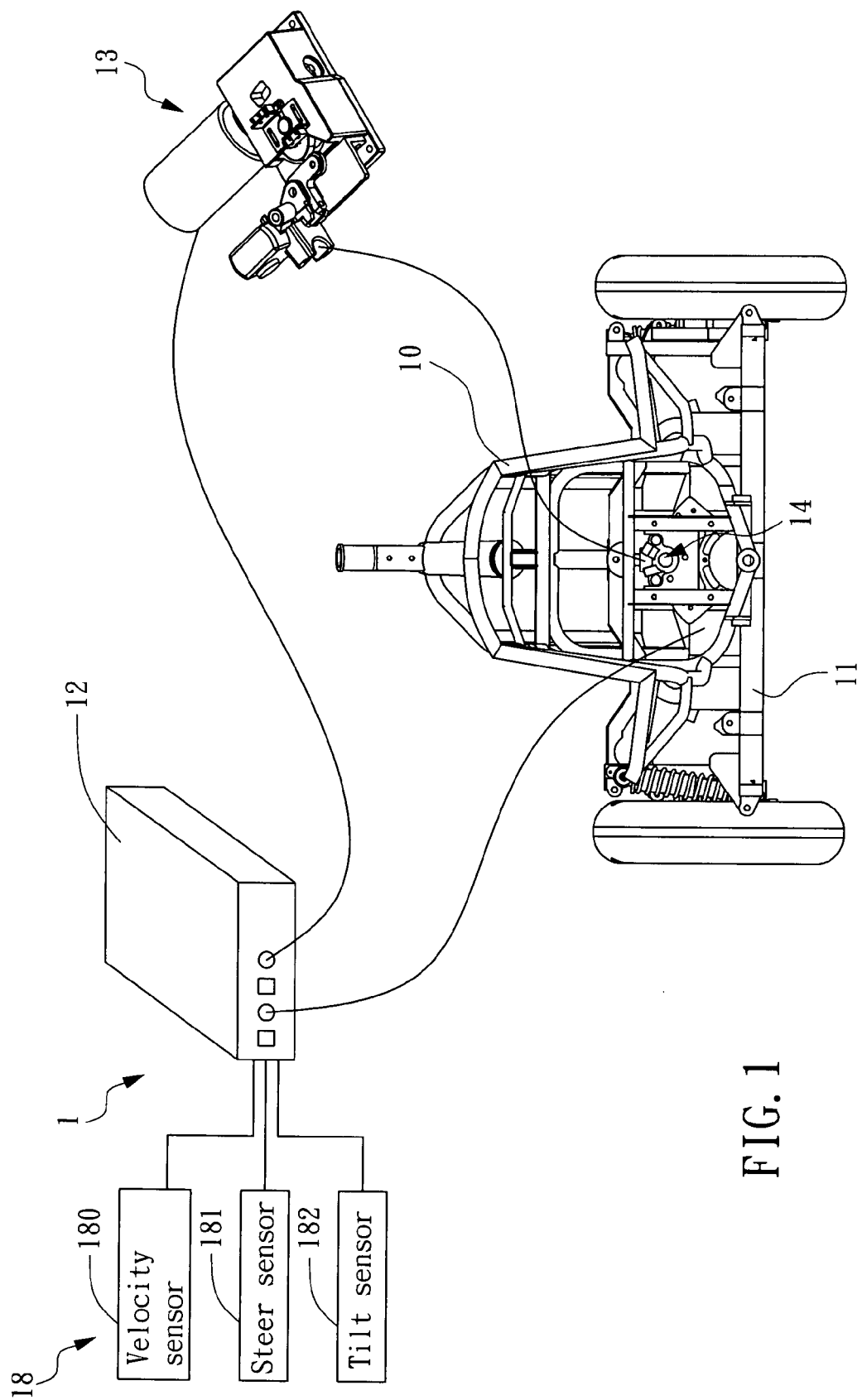
FIG. 1 is a sectional view of an anti-tilt apparatus according to an exemplary embodiment of the invention.

Please refer to FIG. 1, which is a sectional view of an anti-tilt apparatus according to an exemplary embodiment of the invention. The anti-tilt apparatus comprises: a tiltable frame 10, a control device 12, a driving unit 13 and a locking mechanism 14. The tiltable frame 10 is pivotally coupled to a chassis 11 of a tilting vehicle. The control device 12 is used for generating a control signal according to statuses of the tilting vehicle, in which the statuses of the tilting vehicle can be acquired by the use of sensors 18, including a velocity sensor 180, a steer sensor 181 and a tilt sensor 182 the driving unit 13 is coupled to the control device 12 for receiving the control signal and thus generating a driving force accordingly. The locking mechanism 14 is coupled to the driving unit 13 for receiving the driving force and thus using the driving force to lock or release the tiltable frame 10.

Figure 2:
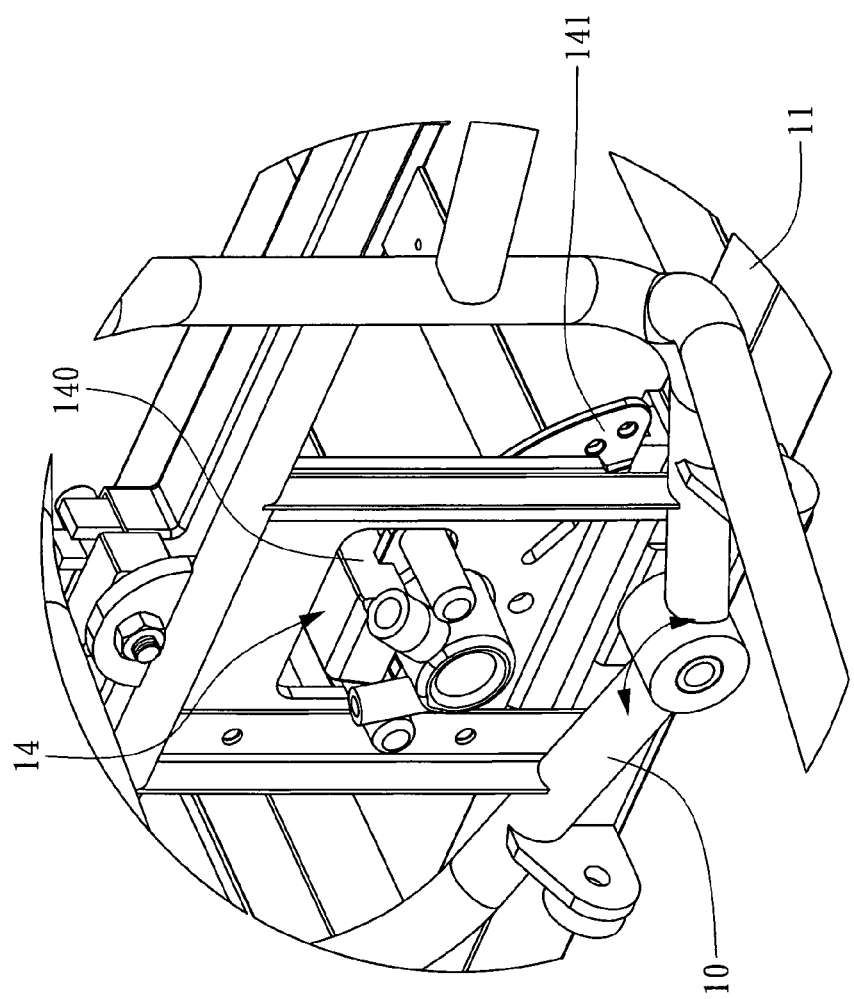
FIG. 2 is a schematic view of a locking mechanism according to a first embodiment of the invention.

Please refer to FIG. 2, which is a schematic view of a locking mechanism according to a first embodiment of the invention. In this first embodiment, the locking mechanism 14 further comprises a locking/releasing unit and a curbing unit. The locking/releasing unit is coupled to the driving unit 13 for receiving the driving force and thus generating a reaction force accordingly; and the curbing unit is disposed at a side of the locking/releasing unit for responding to the reaction force to lock the tiltable frame 10 at a specific position. In this embodiment, the curbing unit is shaped like a disc 141 that is mounted on the chassis 11 of the tilting vehicle; and the locking/releasing unit is substantially a clamp 140 that is mounted on the tiltable frame 10 at a side of the disc-shaped curbing unit 141 for enabling the clamp 140 to respond to the reaction force for generating and thus exerting a clamping force on the disc-shaped curbing unit 141. For activating the clamp 140 to generate the clamping force, the driving unit 13 can be a hydraulic component that is able to exerting an oil pressure for locking or releasing the disc 141 according to the control signal. As the hydraulic component is known to those skilled in the art, it is not described herein. In the foregoing description, the curbing unit is mounted on the chassis 11 of the tilting vehicle, However, it can be mounted on the tiltable frame 10 instead and thus the clamp 140 is mounted on the chassis 11 for achieving the same result as to lock the tiltable frame 10.

Figure 3A:
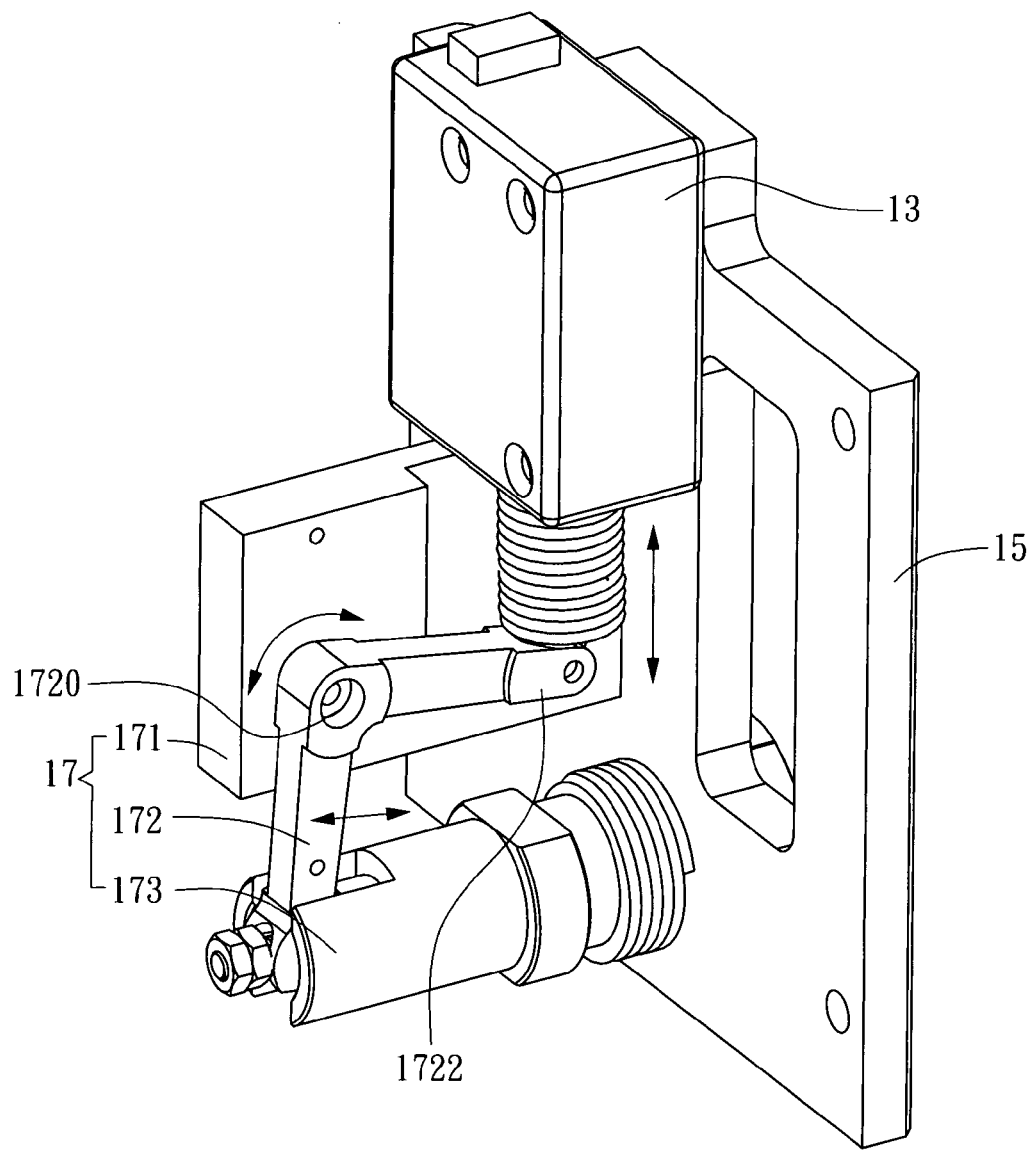
FIG. 3A is a schematic view of a locking mechanism according to a second embodiment of the invention.
Figure 3B:
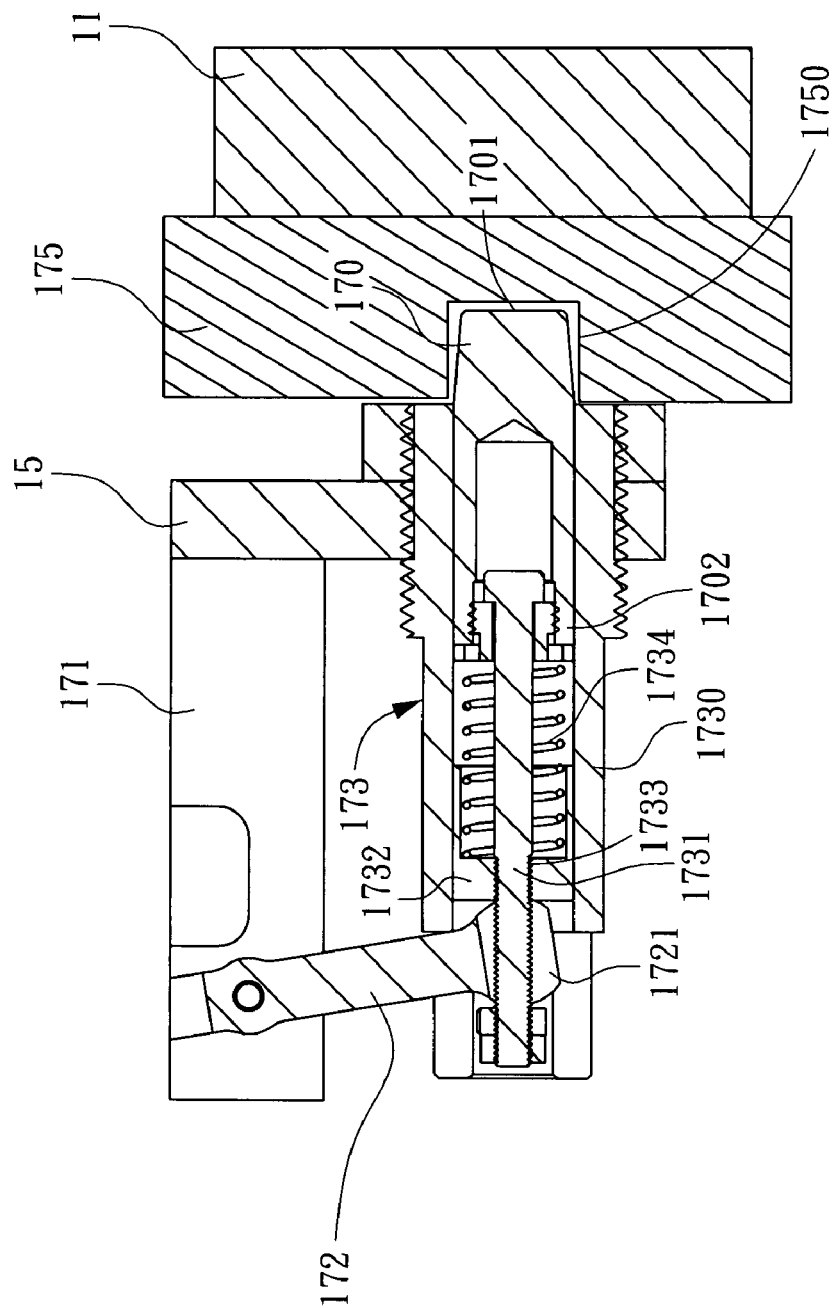
FIG. 3B is a sectional view of a transmission unit of the present invention.

Please refer to FIG. 3A and FIG. 3B, which is a schematic view of a locking mechanism according to a second embodiment of the invention and a sectional view of its transmission unit. In this embodiment, the curbing unit of the locking mechanism 17 is a pinhole plate 175, which is configured with a recess 1750 and is disposed at a side of the locking/releasing unit and connected to the chassis 11. The locking/releasing unit is further comprised of: a pin 170, a plate 171, a push rod 172 and a transmission unit 173. The plate 171 is fixedly disposed on a base 15 connecting to the tiltable frame 10. The push rod 172 is pivotally coupled to the plate 171 by a side thereof at a pivotal position 1720 while having its two ends connected to the driving unit 13 and the transmission unit 173 in respective so that enables the push rod 172 to receive the driving force from the driving unit 13 and thus bringing along the transmission unit 173 to perform the linear motion. The transmission unit 173, being fixedly mounted on the base 15, has a hole formed at an end thereof for receiving the pin 170. It is noted that the pin 170 is designed with an end suitable for insetting into the recess 1750 so as to lock the tiltable frame 10. The transmission unit 173 is further composed of a housing 1730, a connecting rod 1731 and a sliding sleeve 1732. Wherein, the housing 1730 has a accommodating space formed therein; the sliding sleeve 1732, being received in the accommodating space, has a via hole 1733 formed thereon; and the connecting rod 1731 is connected to the pin 1730 by an end thereof while enabling the other end thereof to pass through the via hole 1733 so as to be connected to an end 1721 of the push rod 172. In addition, an elastic member 1734 is sandwiched between the sliding sleeve 1732 and the pin 170. For enabling the licking mechanism 17 to perform the linear motion, the driving unit 13 can be an electromagnetic motor, which is connected to an end 1722 of the push rod 172.

Figure 4B:
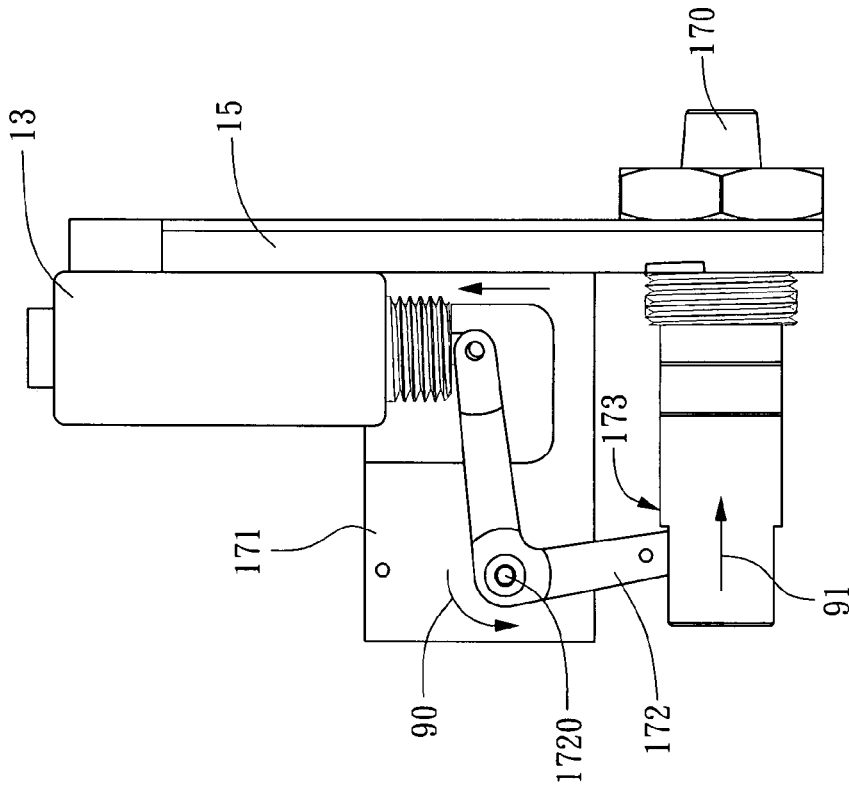
FIG. 4A and FIG. 4B show how the locking mechanism of FIG. 3A is operating.
Figure 4A:
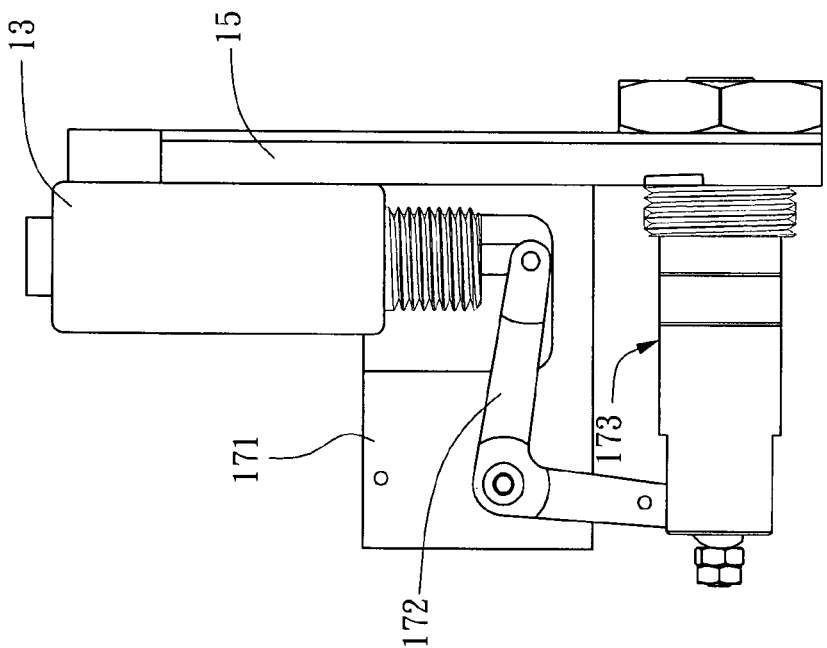

Please refer to FIG. 4A and FIG. 4B, which show how the locking mechanism of FIG. 3A is operating. FIG. 4A shows how and where the transmission unit 173 is situated, i.e. the initial position of the transmission unit 173, when the tilting vehicle is released for tilting. In FIG. 4B, the upward-moving driving unit 13 is going to bring along the push rod 172 to move upward also, and thus as the push rod 172 is pivotally connected to the plate 171 and the end of the push rod 172 connected to the driving unit 13 is brought to move upward, the push rod will perform a rotation 90 about its pivotal position 1720 disposed between itself and the plate 171, thereby, enabling another end of the push rod 172 to perform a liner movement 91 for pushing and insetting the pin 170 into the recess 1750 and thus locking the tiltable frame. For unlocking the frame, the driving unit 13 is activated to move downward for enabling the push rod to rotate counter to the rotation 90 so that the push rod 172 is retract for bringing the pin 170 away from insetting inside the recess 1750, as shown in FIG. 4A.

Figure 5:
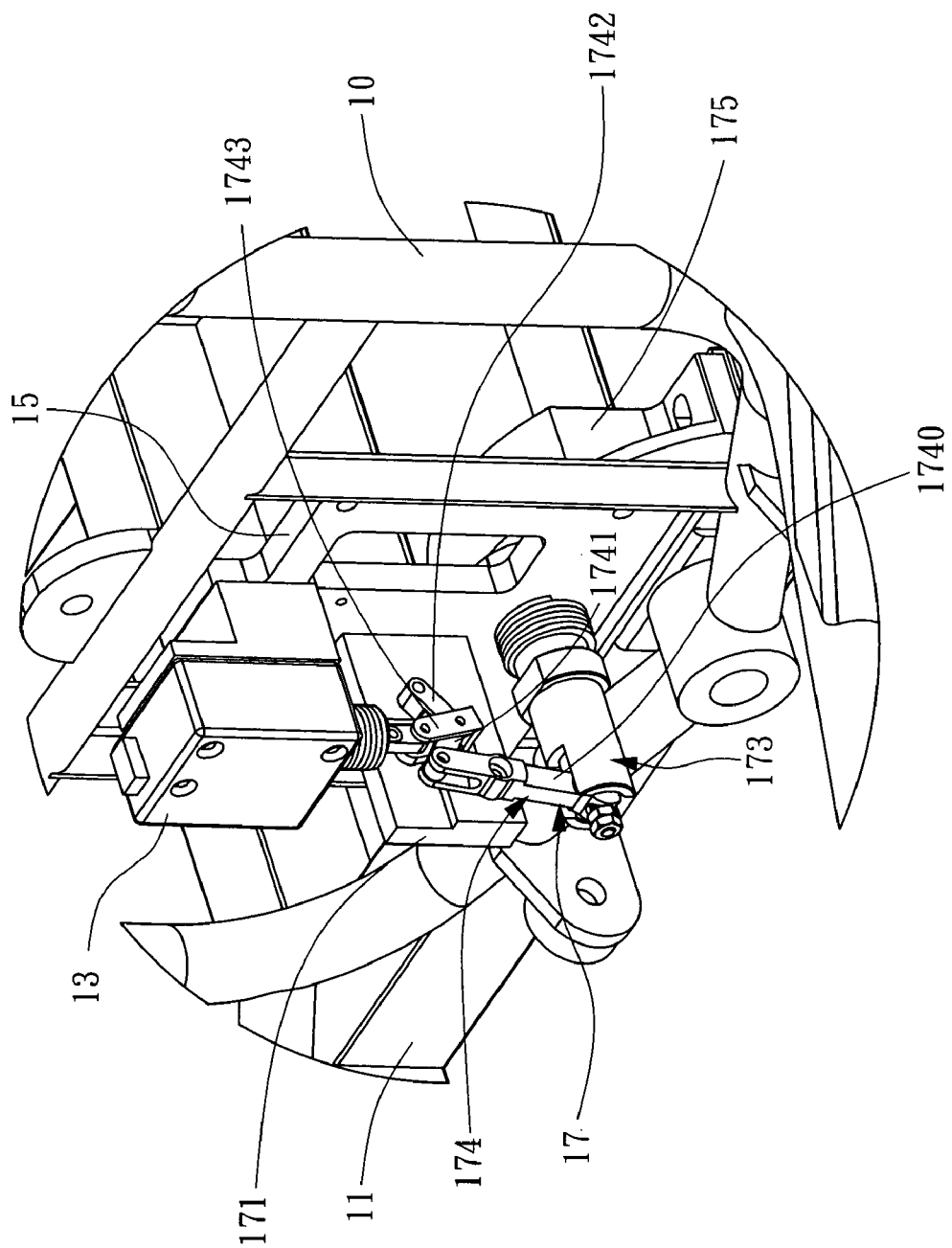
FIG. 5 is a schematic view of a locking mechanism according to a third embodiment of the invention.

Please refer to FIG. 5, which is a schematic view of a locking mechanism according to a third embodiment of the invention. In this embodiment, the locking mechanism 17 is similar to that shown in FIG. 3A, but is different in that the push rod used to push the transmission unit 173 in FIG. 3A is an one-piece element, while the device used in FIG. 5 is a push rod set 174 composed of a first rod 1740, a second rod 1741, a third rod 1742 and a fourth rod 1743. Wherein, the first rod 1740 is pivotally coupled to the plate 171 while having an end thereof connected to the transmission unit 173; the second rod 1741 is pivotally connected to the first rod 1740; the third rod 1742 is pivotally connected to the plate 171 by an end thereof while enabling another end thereof to connect to the second rod 1741; and the fourth rod 1743 is pivotally connected to the transmission unit 173 by an end thereof while enabling another end thereof to coupled to a location at where the second rod 1741 and the third rod 1742 are connected.

Figures 6A, 6B:
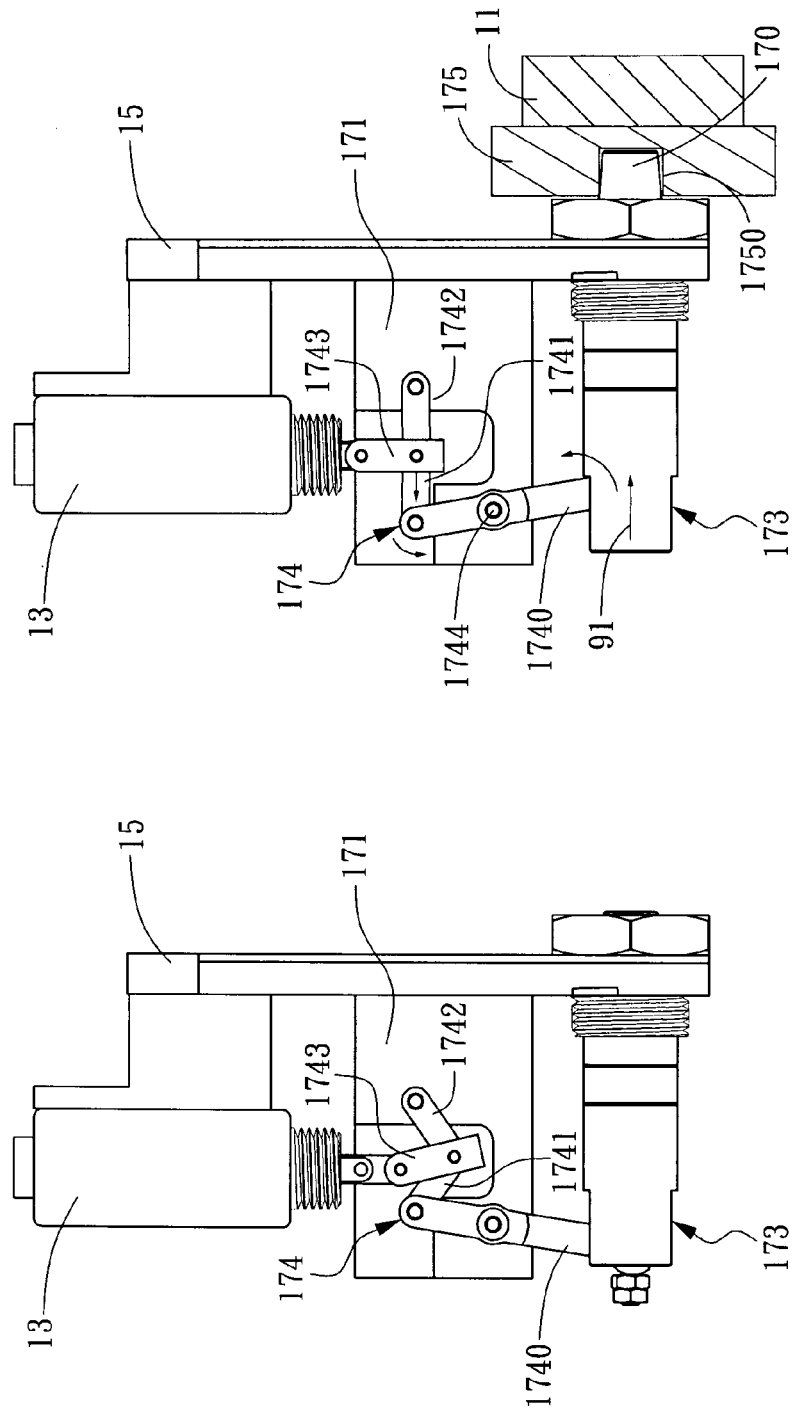
FIG. 6A and FIG. 6B show how the locking mechanism of FIG. 5 is operating.

Please refer to FIG. 6A and FIG. 6B, which show how the locking mechanism of FIG. 5 is operating. FIG. 6A shows how and where the transmission unit 173 is situated, i.e. the initial position of the transmission unit 173, when the tilting vehicle is released for tilting. In FIG. 6B, the upward-moving driving unit 13 is going to bring along the fourth rod 1743 to move upward also, and thus as the fourth rod 1743 is pivotally connected to the second rod 1741 and the third rod 1743, the upward moving fourth rod 1743 will bring the second and the third rods 1741, 1742 to move accordingly. In addition, as the end of the second rod 1741 connecting to the fourth rod 1743 is moving upwardly, the end of the first rod 1740 connecting to the second rod 1741 is pushed to move toward left by the push of the second rod 1742, and as the first rod 1740 is pivotally connected to the plate 171, the first rod 1740 with a left-moving end is going to rotate about its pivotal position 1744 in a counterclockwise manner, thereby, enabling another end of the first rod 1740 to perform a liner movement 91 for pushing and insetting the pin 170 into the recess 1750 and thus locking the tiltable frame. For unlocking the frame, the driving unit 13 is activated to move downward for enabling the first rod 1740 to rotate in a clockwise manner so that the transmission unit 173 is driven to move to the left for bringing the pin 170 away from insetting inside the recess 1750, as shown in FIG. 6A.

Figure 7A:
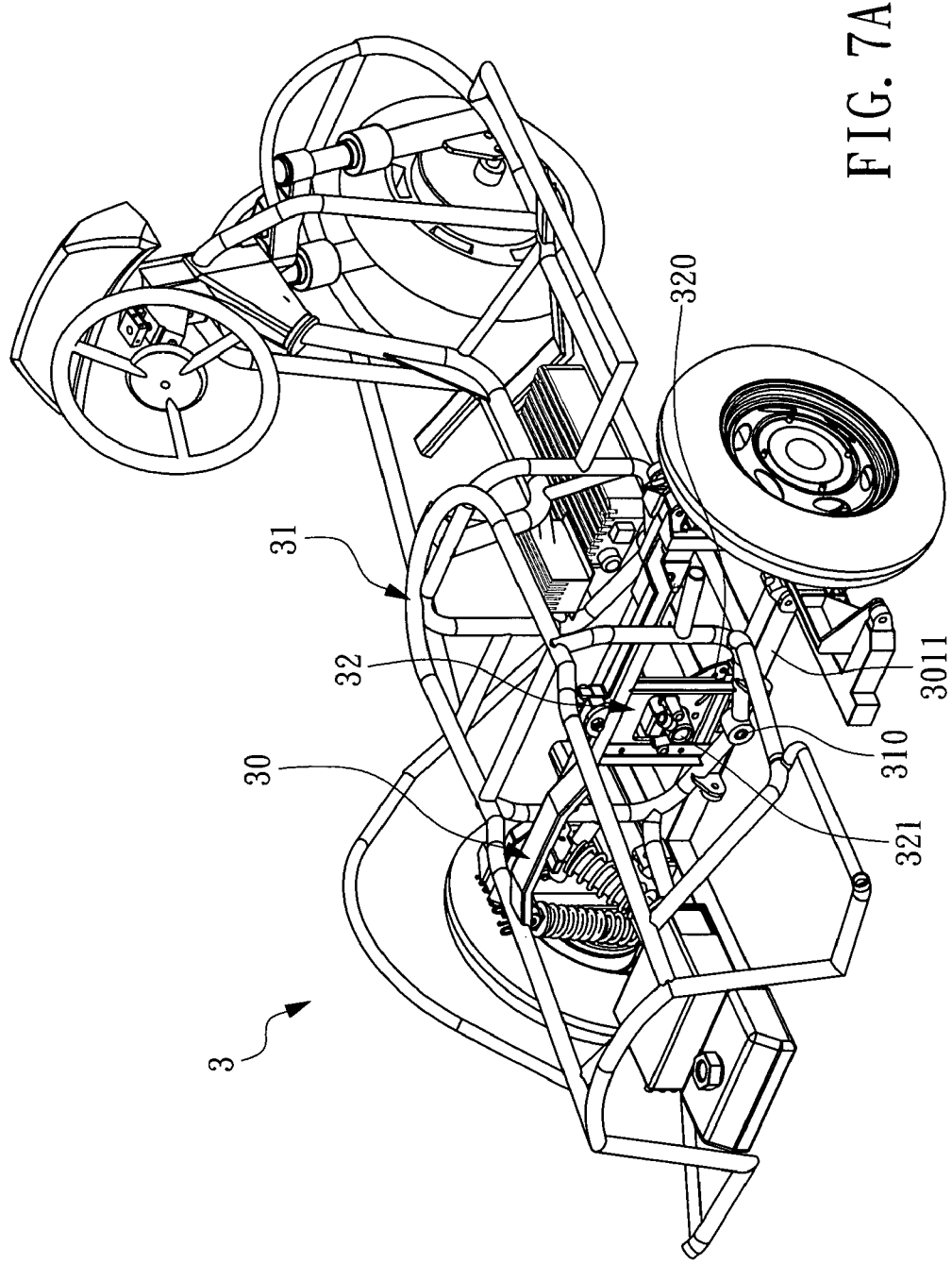
FIG. 7A is schematic diagram showing a vehicle frame for tilting vehicles according to an exemplary embodiment of the invention.
Figure 7B:
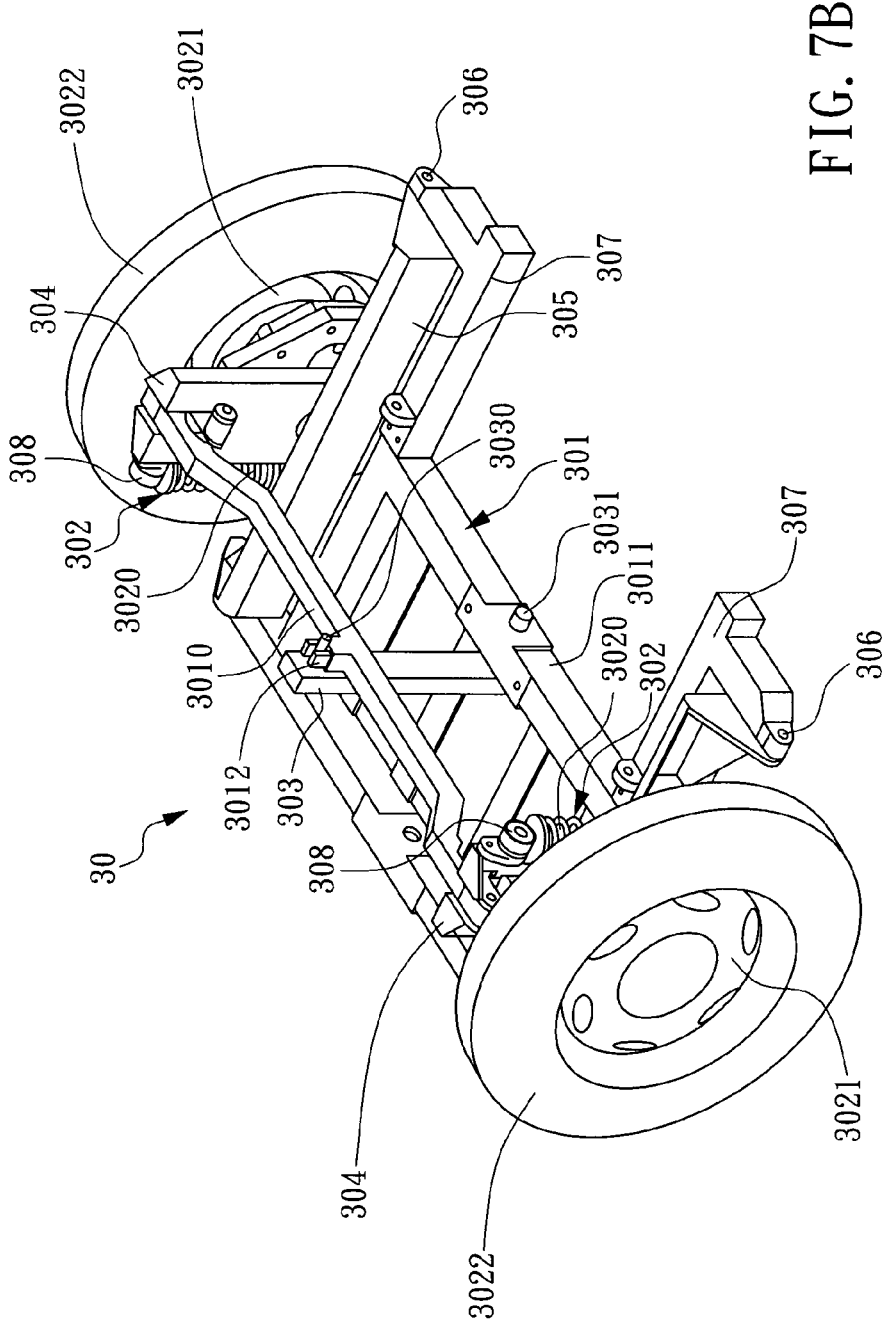
FIG. 7B is a three-dimensional view of a chassis used in a vehicle frame of the invention.

Please refer to FIG. 7A, which is schematic diagram showing a vehicle frame for tilting vehicles according to an exemplary embodiment of the invention. In this embodiment, the vehicle frame 3 comprises a chassis 30 and a tiltable frame 31. The tiltable frame 31 is pivotally connected to the chassis 30 by a pivotal position 310 thereof in a manner enables the tiltable frame to tilt at any angle with respect to the pivotal position 310. Please refer to FIG. 7B, which is a three-dimensional view of a chassis used in a vehicle frame of the invention. In FIG. 7B, the chassis 30 is composed of a linkage mechanism 301 and two independent suspending wheels 302. The linkage mechanism 301 includes: a floating rod 3010; a ground rod 3011, being placed beneath the floating rod and configured with a length longer than that of the floating rod 3010; two rocking arms 304, and a connecting part 303, having a bulging sliding block 3030 matched and inset to a straight sliding slot 3012 defined in the floating rod 3010; wherein an ends of the floating rod 3010 is pivotally connected to an end of one of the two rocking arm 304 while another end of the floating rod 3010 is pivotally connected to an end of another rocking arm 304, and an ends of the ground rod 3011 is pivotally connected to an end of one of the two rocking arms 304 opposite to that connected to the floating rod 3010 while another end of the ground rod 3011 is pivotally connected to an end of another rocking arm 304 opposite to that connected to the floating rod 3010. In an exemplary embodiment, the bulging sliding block, shaped like a column, can be either integrally formed with the connecting part 303, or designed to be bolted onto the connecting part 303.

As the bottom end of the connecting part 303 is pivotally connected to the ground rod 3011 by a pivot shaft 3031, the connecting part 303 and the ground rod 3011 is connected by the disposition of the pivot shaft 3031. In addition, as the two end of the floating rod 3010 are respectively connected to the tops of the two rocking arms 304, the other ends of the two rocking arms are fixedly connected to a base 305 which is extending in a direction perpendicular to the two rocking arms 304. Moreover, the two ends of the base 305 are respectively and pivotally connected to the clipping elements 307 formed at the two ends of the ground rod 3011 by the pivot shafts 306. Each independent suspending wheel 302 is comprised of a hub 3021 and a shock absorber 3020. Wherein, the hub 3021 is pivotally connected to the rocking arms 304 by and is fitted with a tire 3022; and the shock absorber 3020 is configured for enabling its top to pivotally connect to the top of the corresponding rocking arm 304 by a pivot shaft 308 while enabling its bottom to pivotally connect to the bottom of the hub 3021 by the use of a pivot shaft and linkage rod. By the aforesaid vehicle frame, vehicles can maintain a certain comfort, and possess good tracking ability and driving safety, which is featuring in that: the vehicle hull and the wheels is enabled to incline inwardly simultaneously while negotiating a curve or cornering for providing the vehicle a higher static safety factor (SSF) and thus improving the stability and drivability of the vehicle, moreover, the outside wheel is enabled to provide an additional inward force to the vehicle by enabling the outside wheel to incline inwardly more than the inside wheel while negotiating a curve or cornering so as to improving the tracking ability of the wheels and thus enhancing steering safety.

Figure 8:
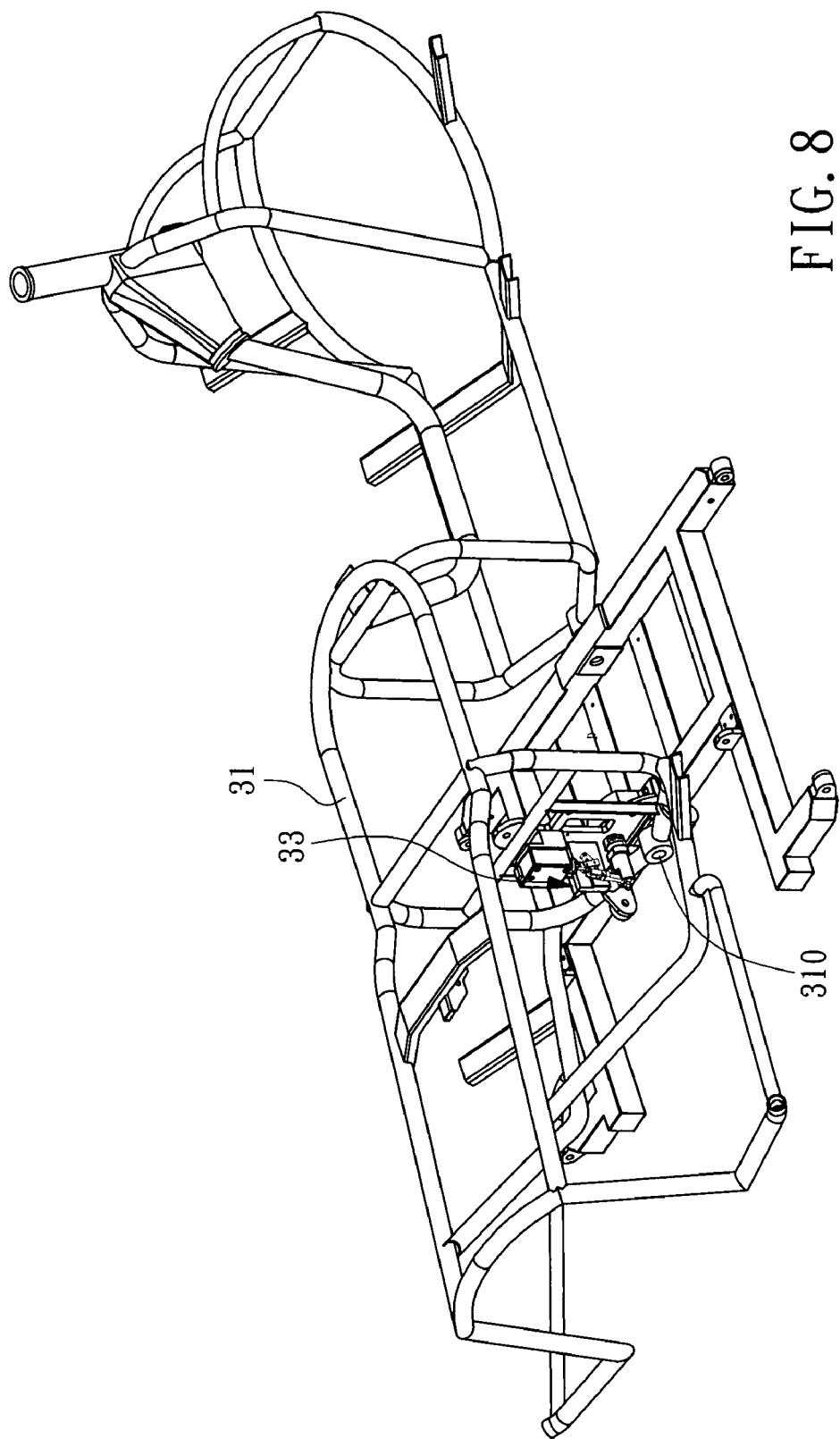
FIG. 8 is schematic diagram showing a vehicle frame for tilting vehicles according to another exemplary embodiment of the invention.

As shown in FIG. 7A, there is an anti-tilt apparatus arranged on the tiltable frame and such anti-tilt apparatus can by any anti-tilt apparatus selected from those embodiments disclosed in FIG. 2, FIG. 3A and FIG. 5. In the embodiment of FIG. 7A, the anti-tilt apparatus is selected to be the one shown in FIG. 2, while mounting the disc-shaped curbing unit 320 of its locking mechanism 32 on the ground rod 3011 of its chassis and the clamp 321 on the tiltable frame 31. Thereby, as to how the clamp 321 and disc-shaped curbing unit 320 are operating is similar to that described hereinbefore and thus is not describe further. Please refer to FIG. 8, which is schematic diagram showing a vehicle frame for tilting vehicles according to another exemplary embodiment of the invention. In the embodiment shown in FIG. 8, the locking mechanism 33 is configured the same as that shown in FIG. 5, but it is mounted in the tiltable frame 31.

To sum up, the vehicle frame provided in the present invention is capable of maintaining the stability of the vehicle while the vehicle is operating in low speed and enabling the frame of the vehicle to tilt while the vehicle is operating in high speed. In addition, the anti-tilt apparatus not only can be adapted for the vehicle frame shown in FIG. 7, but it can be modified and varied to be adapted for any tilting vehicles, only if the chassis and frame of such tilting vehicle can incline relative to each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An anti-tilt apparatus, comprising:
a tiltable frame, arranged on a tilting vehicle;
a control device, capable of generating a control signal according to statuses of the tilting vehicle;
a driving unit, coupled to the control device for receiving the control signal and thus generating a driving force accordingly;
a locking/releasing unit, coupled to the driving unit for receiving the driving force and thus generating a reaction force accordingly; and
a curbing unit, disposed at a side of the locking/releasing unit for responding to the reaction force to lock the tiltable frame at a specific position,
wherein the curbing unit, being a pinhole plate having a recess formed thereon, is disposed at a side of the locking/releasing unit; and the locking/releasing unit further comprises:
a plate;
a pin;
a transmission unit, mounted on the tiltable frame in a manner that enables the transmission unit to perform a linear motion so as to bring along the pin to perform one action selected from the group consisting of: moving the pin forward and thus insetting into the recess, and retracting the pin away from the recess; and
a push rod, pivotally coupled to the plate by a side thereof while having its two ends connected to the driving unit and the transmission unit in respective so that enables the push rod to receive the driving force for bringing along the transmission unit to perform the linear motion.

2. The anti-tilt apparatus of claim 1, wherein the curbing unit, shaped like a disc, is mounted on a chassis of the tilting vehicle, and the locking/releasing unit, being a clamp, is mounted on the tiltable frame at a side of the disc-shaped curbing unit for enabling the clamp to respond to the reaction force for generating and thus exerting a clamping force on the disc-shaped curbing unit.

3. The anti-tilt apparatus of claim 1, wherein the curbing unit, shaped like a disc, is mounted on the tiltable frame, and the locking/releasing unit, being a clamp, is mounted on a chassis of the tilting vehicle at a side of the disc-shaped curbing unit for enabling the clamp to respond to the reaction force for generating and thus exerting a clamping force on the disc-shaped curbing unit.

4. An anti-tilt apparatus, comprising:
a tiltable frame, arranged on a tilting vehicle;
a control device, capable of generating a control signal according to statuses of the tilting vehicle;
a driving unit, coupled to the control device for receiving the control signal and thus generating a driving force accordingly;
a locking/releasing unit, coupled to the driving unit for receiving the driving force and thus generating a reaction force accordingly; and
a curbing unit, disposed at a side of the locking/releasing unit for responding to the reaction force to lock the tiltable frame at a specific position,
wherein the curbing unit, being a pinhole plate having a recess formed thereon, is disposed at a side of the locking/releasing unit; and the locking/releasing unit further comprises:
a plate;
a transmission unit, mounted on the tiltable frame in a manner that enables the transmission unit to perform a linear motion so as to bring along a pin to perform one action selected from the group consisting of: moving the pin forward and thus insetting into the recess, and retracting the pin away from the recess;
a first rod, pivotally coupled to the plate while having an end thereof connected to the transmission unit;
a second rod, pivotally connected to the first rod;
a third rod, pivotally connected to the plate by an end thereof while enabling another end thereof to connect to the second rod; and
a fourth rod, pivotally connected to the transmission unit by an end thereof while enabling another end thereof to coupled to a location at where the second rod and the third rod are connected.

5. The anti-tilt apparatus of claim 1, further comprising: at least a sensor, each consisting of a steer sensor, a velocity sensor, a tilt sensor and the combination thereof, for sensing the statuses of the tilting vehicle.

6. A vehicle frame for tilting vehicles, comprising:
a chassis, further comprising:
a linkage mechanism, comprised of:
a ground rod;
a floating rod, being placed over the ground rod and parallel thereto;
two rocking arms; and
a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod;

wherein, an ends of the floating rod is pivotally connected to an end of one of the two rocking arm while another end of the floating rod is pivotally connected to an end of another rocking arm, and an ends of the ground rod is pivotally connected to an end of one of the two rocking arms opposite to that connected to the floating rod while another end of the ground rod is pivotally connected to an end of another rocking arm opposite to that connected to the floating rod; and an independent suspending mechanism, comprised of:

a hub, pivotally connected to the rocking arms by at least a pair of suspending rods; and a shock absorber, configured for enabling the top of the shock absorber to pivotally connect to the top of the corresponding rocking arm while enabling the bottom of the shock absorber to pivotally connect to the bottom of the hub;

a tiltable frame, mounted on the chassis;

a control device, capable of generating a control signal according to statuses of the tilting vehicle;

a driving unit, coupled to the control device for receiving the control signal and thus generating a driving force accordingly;

a locking/releasing unit, coupled to the driving unit for receiving the driving force and thus generating a reaction force accordingly; and a curbing unit, disposed at a side of the locking/releasing unit for responding to the reaction force to lock the tiltable frame at a specific position.

7. The vehicle frame of claim 6, wherein the curbing unit, shaped like a disc, is mounted on a chassis of the tilting vehicle, and the locking/releasing unit, being a clamp, is mounted on the tiltable frame at a side of the disc-shaped curbing unit for enabling the clamp to respond to the reaction force for generating and thus exerting a clamping force on the disc-shaped curbing unit.

8. The vehicle frame of claim 6, wherein the curbing unit, shaped like a disc, is mounted on the tiltable frame, and the locking/releasing unit, being a clamp, is mounted on a chassis of the tilting vehicle at a side of the disc-shaped curbing unit for enabling the clamp to respond to the reaction force for generating and thus exerting a clamping force on the disc-shaped curbing unit.

9. The vehicle frame of claim 6, wherein the curbing unit, being a pinhole plate having a recess formed thereon, is disposed at a side of the locking/releasing unit; and the locking/releasing unit further comprises:

a plate;

a pin;

a transmission unit, mounted on the tiltable frame in a manner that enables the transmission unit to perform a linear motion so as to bring along the pin to perform one action selected from the group consisting of: moving the pin forward and thus insetting into the recess, and retracting the pin away from the recess; and a push rod, pivotally coupled to the plate by a side thereof while having its two ends connected to the driving unit and the transmission unit in respective so that enables the push rod to receive the driving force for bringing along the transmission unit to perform the linear motion.

10. The vehicle frame of claim 6, wherein the curbing unit, being a pinhole plate having a recess formed thereon, is disposed at a side of the locking/releasing unit; and the locking/releasing unit further comprises:

a plate;

a transmission unit, mounted on the tiltable frame in a manner that enables the transmission unit to perform a linear motion so as to bring along a pin to perform one action selected from the group consisting of: moving the pin forward and thus insetting into the recess, and retracting the pin away from the recess;

a first rod, pivotally coupled to the plate while having an end thereof connected to the transmission unit;

a second rod, pivotally connected to the first rod;

a third rod, pivotally connected to the plate by an end thereof while enabling another end thereof to connect to the second rod; and a fourth rod, pivotally connected to the transmission unit by an end thereof while enabling another end thereof to coupled to a location at where the second rod and the third rod are connected.

11. The vehicle frame of claim 6, further comprising: at least a sensor, each consisting of a steer sensor, a velocity sensor, a tilt sensor and the combination thereof, for sensing the statuses of the tilting vehicle.

12. A vehicle frame for tilting vehicles, comprising:

a chassis, further comprising:

a linkage mechanism, comprised of:

a ground rod;

a floating rod, being placed over the ground rod and parallel thereto;

two rocking arms; and a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod;

wherein, an ends of the floating rod is pivotally connected to an end of one of the two rocking arm while another end of the floating rod is pivotally connected to an end of another rocking arm, and an ends of the ground rod is pivotally connected to an end of one of the two rocking arms opposite to that connected to the floating rod while another end of the ground rod is pivotally connected to an end of another rocking arm opposite to that connected to the floating rod; and an independent suspending mechanism, comprised of:

a hub, pivotally connected to the rocking arms by at least a pair of suspending rods; and a shock absorber, configured for enabling the top of the shock absorber to pivotally connect to the top of the corresponding rocking arm while enabling the bottom of the shock absorber to pivotally connect to the bottom of the hub;

a tiltable frame, mounted on the chassis;

a locking/releasing unit, for receiving a driving force and thus generating a reaction force accordingly; and a curbing unit, disposed at a side of the locking/releasing unit for responding to the reaction force to lock the tiltable frame at a specific position.

13. The vehicle frame of claim 12, wherein the curbing unit, shaped like a disc, is mounted on a chassis of the tilting vehicle, and the locking/releasing unit, being a clamp, is mounted on the tiltable frame at a side of the disc-shaped curbing unit for enabling the clamp to respond to the reaction force for generating and thus exerting a clamping force on the disc-shaped curbing unit.

14. The vehicle frame of claim 12, wherein the curbing unit, shaped like a disc, is mounted on the tiltable frame, and the locking/releasing unit, being a clamp, is mounted on a chassis of the tilting vehicle at a side of the disc-shaped curbing unit for enabling the clamp to respond to the reaction force for generating and thus exerting a clamping force on the disc-shaped curbing unit.

15. The vehicle frame of claim 12, wherein the curbing unit, being a pinhole plate having a recess formed thereon, is disposed at a side of the locking/releasing unit; and the locking/releasing unit further comprises:
    a plate;
    a pin;
    a transmission unit, mounted on the tiltable frame in a manner that enables the transmission unit to perform a linear motion so as to bring along a pin to perform one action selected from the group consisting of: moving the pin forward and thus insetting into the recess, and retracting the pin away from the recess; and
    a push rod, pivotally coupled to the plate by a side thereof while having its two ends connected to the driving unit and the transmission unit in respective so that enables the push rod to receive the driving force for bringing along the transmission unit to perform the linear motion.

16. The vehicle frame of claim 12, wherein the curbing unit, being a pinhole plate having a recess formed thereon, is disposed at a side of the locking/releasing unit; and the locking/releasing unit further comprises:
    a plate;
    a transmission unit, mounted on the tiltable frame in a manner that enables the transmission unit to perform a linear motion so as to bring along a pin to perform one action selected from the group consisting of: moving the pin forward and thus insetting into the recess, and retracting the pin away from the recess;
    a first rod, pivotally coupled to the plate while having an end thereof connected to the transmission unit;
    a second rod, pivotally connected to the first rod;
    a third rod, pivotally connected to the plate by an end thereof while enabling another end thereof to connect to the second rod; and
    a fourth rod, pivotally connected to the transmission unit by an end thereof while enabling another end thereof to coupled to a location at where the second rod and the third rod are connected.

17. The vehicle frame of claim 12, further comprising: at least a sensor, each consisting of a steer sensor, a velocity sensor, a tilt sensor and the combination thereof, for sensing the statuses of the tilting vehicle.

* * * * *